Feb. 8, 1944.  H. R. GILLETTE  2,340,956
TUBULAR PRODUCT
Original Filed May 1, 1939
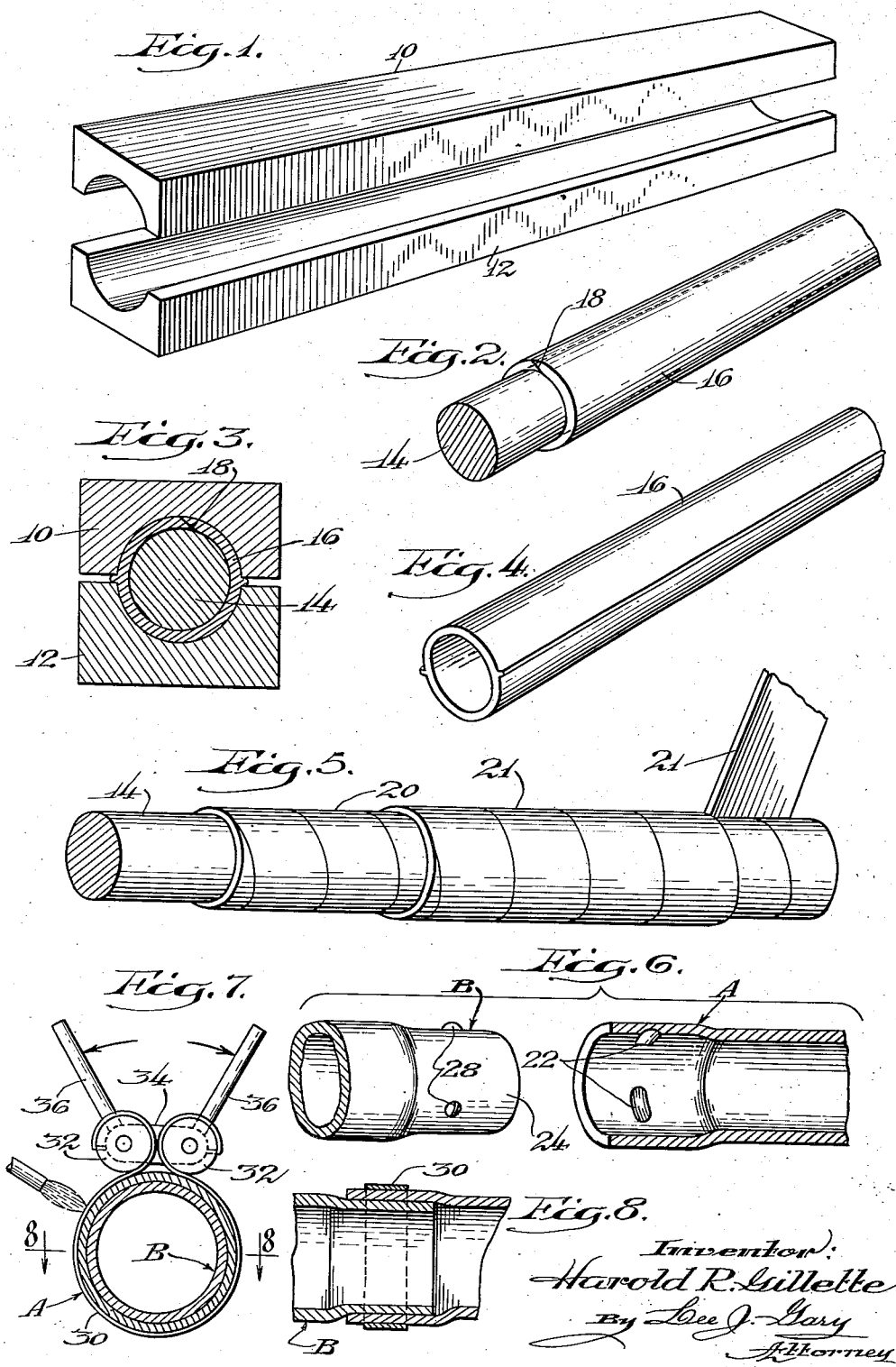
Inventor:
Harold R. Gillette
By Lee J. Gary
Attorney.

Patented Feb. 8, 1944

2,340,956

UNITED STATES PATENT OFFICE 2,340,956

TUBULAR PRODUCT

Harold R. Gillette, Boston, Mass., assignor to Federal Electric Co., Inc., Chicago, Ill., a corporation of New York Original application May 1, 1939, Serial No. 270,987. Divided and this application January 21, 1942, Serial No. 427,537

10 Claims. (Cl. 138—76)

This application is a division of my co-pending application Serial No. 270,987 filed May 1, 1939.

The present invention relates to the manufacture of tubing, pipe, conduit and similar structural sections having a continuous wall, and to the resulting product of manufacture.

The present invention more particularly contemplates the production of a tubular product, as above, from an improved plastic composition comprising materials which are readily available and inexpensive and which are combined to provide a unit having improved structural properties. Heretofore tubing capable of resisting severe conditions of usage has been costly, as well as having a high weight per unit of length. Structural conduit material formed of metal is characterized by these deficiencies and as well is attacked by corrosive influences. Many known plastic materials are not only prohibitively expensive for extensive use but are deficient in desired structural properties. For example, many synthetic plastic compositions, even when combined with fillers of various sorts, are characterized by brittleness and fragility and tend to warpage and deterioration. Other plastic materials lack rigidity and present manufacturing difficulties.

It is an object of the present invention to provide a process of manufacture of tubular sections from an improved plastic composition which obviates the above difficulties and provides a product having a continuous wall section of substantially uniform strength and elasticity, which is substantially impervious to moisture, light in weight and resistant to corrosive influences, which process involves relatively simple steps including the formation of a sheet and the subsequent configurating of the sheet into a tubular product.

In accordance with the present invention, a plastic product comprising matted, fibrous paper pulp treated and combined with extracted pine wood pitch is formed into sheets, dried and cured, and molded into a continuous tubular section.

The specific pitch material employed in accordance with the present invention is a complex resinous material the exact combination of which is unknown but which comprises the residue left after the separation of the resin, turpentine, pine oil and other valuable products from the residues resulting from the extraction of pine wood. The product is obtained in connection with the production of wood rosin from pine wood and comprises a pitch residue low in abietic acid remaining after the separation of refined rosin and the more volatile constituents. In treating pine wood in accordance with the foregoing process, rosin may be extracted by the use of a suitable solvent, such as hot gasoline or benzol, after steaming the wood to volatilize the volatile oils; or, alternatively, the volatile oils may be extracted with the rosin without first steaming for the removal. The extract is then distilled to remove the solvent and/or the turpentine and pine oil and the resulting resinous material is treated in any one of a number of ways known in the art for the removal of the rosin. The present invention contemplates the employment of the residue remaining after the removal of the refined rosin and which, for the purposes of the present description, is known as extracted pine wood pitch. Such a material is produced and sold by the Hercules Powder Company under the trade-mark "Vinsol."

It is particularly important to note that the product "Vinsol" is characterized by a marked brittleness, which renders it unsuitable for ordinary structural purposes. In accordance with the present invention, the product is treated and combined with pulp to form a continuous sheet or wall section having the desired structural properties.

The pulp or paper stock employed in accordance with the present invention may comprise any of the conventional paper pulps, such as the cellulose pulps, including sulphite and kraft, or pulps formed from cheap waste papers or rags. In its broadest aspect the present invention contemplates other fibrous products which are known broadly as pulp materials and including such fibers as wool, asbestos or even glass fibers. It will be understood, however, in accordance with the present disclosure, that the character of the final product will vary comparatively in accordance with the particular type of pump fiber employed, and it is to be noted that the use of the more conventional pulp fibers constitutes the preferred embodiment of the present invention.

The present invention contemplates the initial formation of the plastic composition substantially in accordance with the steps outlined in my copending application Serial No. 254,830, filed February 6, 1939. In accordance with the present invention, the paper stock and extracted pine wood pitch are combined by first defibering the stock in a suitable apparatus, such as a Hollander beater, preferably in the presence of an aqueous medium, as is done in accordance with known paper-making practice. It is preferred that the application of the beater treatment be carried to a degree producing defiberization. Where a relatively "free" stock is employed, drying of the product is promoted. On the other hand, for many purposes it is preferred that the treatment be carried to a point beyond mere defiberization to produce a "slow" stock which does not quite as readily part with its water content upon the screen. The extracted pine wood pitch in finely powdered form is now added to the beater stock. Obviously, minutely comminuted resinous material of the present class resists admixture with a fluid aqueous stock, particularly in a substantial quantity. The initial combination of the pine wood pitch is effected by thoroughly wetting out the powdered pitch with a suitable wetting agent. To this end the charge of pitch is mixed up to form a slurry with a suitable amount of water having dissolved therein any suitable wetting agent. The thoroughly wetted out admixture may be added to the beater to mix thoroughly with the charge therein.

In accordance with the preferred embodiment of the present invention, it has been found that the plastic products produced in accordance with the invention possess a softening or melting point which is too low for many purposes, and it is therefore contemplated that the product be treated for substantially raising the softening point of the plastic mass, to-wit, the temperature at which the plastic ingredients soften or melt. Thus, while extracted pine wood pitch may appreciably lose its desirable characteristics at or about the boiling point of water, the preferred product produced in accordance with the present invention is rigid at such temperatures. This property may be obtained in accordance with any of a plurality of treatments. Among the treatments for producing a product having an elevated softening and melting point is that set out in detail in United States Letters Patent No. 2,115,496, granted April 26, 1938, to Cornelis Maters. That is to say, in place of untreated extracted pine wood pitch, there may be added to the beater charge in the foregoing manner one of the formaldehyde derivatives of the extracted pine wood pitch.

According to an alternative expedient which obviates the cost and difficulties of the formaldehyde treatment, the extracted pine wood pitch is treated with a basic substance comprising certain metal oxides or hydroxides, in accordance with the invention set out in the copending application of Philip Goldstein and Harold R. Gillette, Serial No. 258,577, filed February 25, 1939. In accordance with this invention, it has been found that the addition of a small percentage of, for example, finely divided zinc oxide results in a product having a satisfactory degree of infusibility. The zinc oxide or equivalent substance may be readily admixed in the beater by incorporating it into the slurry comprising a wetting agent and extracted pine wood pitch. The slurry may be added to the beater containing the paper stock at any time before, during or after refining.

The beater may be actuated to thoroughly admix the separate ingredients. It is desirable to adjust the hydrogen ion concentration of the admixed beater stock, preferably by the use of papermaker's alum, to a condition favorable to the retention and fixing of the particles upon the paper fibers. In ordinary practice it has been found that satisfactory fixation occurs provided the pH of the product is in the neighborhood of 4.5 and preferably below 5.5. In general it may be stated that the pH should be adjusted until the turbidity and muddy appearance caused by the suspended solid particles tend to disappear. This condition may also be determined by observing the whitewater resulting from the board formation, as will hereinafter appear, proper adjustment having been secured when the whitewater appears to be clear of turbidity.

After the desired refining, the beater charge is supplied to any suitable paper- or board-forming machinery for the formation of suitable sheets from the plastic composition. It will be understood that the machinery may comprise the conventional wet machine or any of the cylinder paper-making machines or the so-called Fourdrinier. Formation of sheets of paper or board is thus carried out in a conventional manner, the deposition of pulp solids occurring on the reticulated screen or support. The resulting sheets, while capable of readily supporting themselves, are nevertheless in the wet state and it is preferred that they be dried before further treatment. Drying may be accomplished in the usual manner by passage adjacent heated drums or, alternatively, in a current of warm, dry air, and drying may be expedited by initial wet pressing, where desired.

The further treatment of the product may follow various preferred procedures, but in general involves molding a compacted sheet formation, combined with the shaping of the sheet to the desired cylindrical section and the uniting of the opposed edges thereof into a continuous wall. According to one illustrative method, the dried webs or sheets are placed in a suitable press or mold at a temperature above the softening or curing point of the plastic composition and retained under a sufficient pressure for a sufficient length of time to produce the desired cured product. In forming compressed sheets or boards, the web is placed between flat platens at a pressure of, for example, 825 pounds per square inch. The platens of the press may be heated if desired, although it has been found that the molded board product may be preheated uniformly and may retain the heat during the pressing step sufficiently to permit molding and curing in view of the abnormal speed of curing of the present composition. The cured sheet material may be thus formed so that the heat lost during the curing leaves the product in a hard, unplastic state where it may be readily handled and removed from the mold.

The steps for forming the continuous tubular sections are more clearly illustrated in accordance with the figures of the drawing, wherein there are disclosed the illustrative steps and devices which may be employed for carrying out the process. In accordance with this drawing:

Fig. 1 is a perspective view of a tube mold;

Fig. 2 is a perspective view of a mandrel having a sheet of material arranged thereon prior to molding;

Fig. 3 is a sectional view taken transversely across the mold in Fig. 1 with the assembly in Fig. 2 in position during molding;

Fig. 4 is a perspective view of a portion of a finished tube;

Fig. 5 is a perspective view showing the combination of mandrel and moldable sheet material, the sheet being applied in accordance with the modified arrangement;

Fig. 6 is a perspective view showing the interengageable ends of a pair of pipe sections formed for ready, permanent interengagement;

Fig. 7 is a sectional view taken transversely adjacent a modified form of pipe juncture and showing a preferred pressure-producing machine in plan; and Fig. 8 is a view of the joined pipe sections of Fig. 7 taken on the line 8—8 in Fig. 7.

Fig. 1 illustrates a tube or pipe mold having upper end lower separable portions 10 and 12, respectively. It should be noted that each of the sections is configurated with an opposed semi-cylindrical recess, which recesses together provide cylindrical die surfaces for shaping the outer face of a cylindrical tube. The elements of this die are adapted to be placed within the platens of any conventional type of press. A mandrel 14 cooperates with the foregoing die construction to shape the interior surfaces of the tube. In carrying out the present invention, a sheet of the molded, compressed plastic board produced in accordance with the foregoing steps is wrapped about the mandrel as clearly illustrated in Fig. 2. It is important to note that the edges of sheet 16 are cut or skived at an acute angle to the plane of the sheet so that they radially overlap throughout a relatively considerable area. Although it will be apparent, in accordance with the above disclosure, that the foregoing molded sheet is normally sufficiently hard and rigid so that it cannot be wrapped about the mandrel 14, nevertheless this may be accomplished by first heating the sheet to the softening temperature, preferably to about 275 to 280 degrees Fahrenheit.

The wrapped mandrel is placed between the forming dies 10 and 12 and a force applied through the agency of the press to bring the sections of the die together. It will be understood that the parts of the die and mandrel must be proportioned with respect to the thickness of the sheet 16 to subject the sheet, and particularly the abutted, overlapped ends thereof, to a pressure sufficient to produce healing of the thermoplastic material. Such a pressure should preferably be at least equivalent to a pressure of 825 pounds per square inch or over. It will be understood that during the molding step the plastic sheet is heated to a temperature above the softening or curing temperature. This, as pointed out above, may be accomplished by preheating the sheet as aforementioned or by preheating the mandrel and die blocks 10 and 12.

The product of the foregoing tube molding step is shown in Fig. 4, wherein the forming dies have been separated from the exterior of the tube and the mandrel removed from the interior. It will be seen that the overlapped edges of the sheet are joined together as at 18. It has been found that the plastic composition united in this manner provides a joint which is substantially as structurally sound as the remainder of the annular wall.

An alternative method of forming the tube is illustrated more or less diagrammatically in Fig. 5 wherein the mandrel 14 is wrapped spirally with a strip or strips of the sheet plastic material preformed in the foregoing manner. In accordance with the preferred embodiment, it will be noted that the winding is formed in two layers, the first or innermost layer being provided by a strip 20 which is of such a width as to permit it to be conveniently applied as a spiral preferably with the edges of the strip in abutment and while in the heated plastic condition. A second strip 21 is applied over the first strip and spirally wound so that it resides above the line of juncture formed by the edges of the lower strip. The assembly is placed between the opposed forming die members 10 and 12 and molded substantially exactly in accordance with the foregoing procedure.

It is to be particularly noted that in accordance with the present invention the abutting ends or overlapping junctures interlock to form a uniform seal in the final article. This is of particular significance when it is remembered that the extracted pine wood pitch per se is extremely friable and brittle, and it is only in combination with the pulp fibers and particularly in its hardened form that the desired structural properties are achieved. It is accordingly thought that the present molding process results in an actual interfelting or interlacing of the fibers of the plastic mass or otherwise in the homogeneous plastic sealing of the edges such that the structural properties are rendered uniform throughout the juncture. It has been found in particular that improved results are obtained when the opposed overlying surfaces forming the juncture 18 are, for example, first roughened slightly in a manner such as results from scraping or abrasion, so that any glaze is removed and the ends of the fibers liberated. The intercompression of the adjacent surfaces under elevated heat and pressure then promotes the intermatting of the fiber ends, and a similar result occurs in connection with the overlying matted fibers of the spirally wound embodiment shown in Fig. 5 when subjected to molding in the pipe die. It should be noted, moreover, that in accordance with the last named embodiment the pressure of the mold normally tends to flow the material laterally so that the abutted edges similarly interjoin.

The foregoing description is intended to be illustrative only, and it will be understood, therefore, that the invention is not limited in respect to the number of layers of sheet material supplied to the molding machine. Thus, in the embodiment shown in Fig. 5, three or more layers of strip material may be wound about the mandrel 14 if desired. The same remarks apply to the other embodiments. So also, as suggested above, the molding device need not necessarily apply pressure to the tubular wound strip at all points, since satisfactory tubes have been made where only the overlapping or adjacent edges which are to be joined have been subjected to pressure and heat.

On the other hand, the present invention contemplates the molding of the tubular sections from the sheet product as it comes directly from the paper- or board-forming machine. Thus the foregoing illustrative examples have contemplated, in general, the molding of the paper board product into finished plastic sheets prior to the tube-forming steps. The present invention comprehends the omission of the preliminary molding of the sheet under heat and pressure. That is to say, the layer or layers of strip or web formed about the mandrel 14 may for many purposes comprise the dried web as it comes from the paper machine preferably warmed sufficiently to permit it to readily extend about the mold. It will be evident from the foregoing, however, that in practicing this modification of the invention, the tubular section must preferably be subjected to molding under elevated heat and pressure throughout its circumferential extent so that the final tube will be in plastic molded condition.

The present invention contemplates the formation of tubular shapes in accordance with various other forming steps. Thus the sheet material may be initially applied in tubular form to the inner surface of a cylindrical mold and pressure applied interiorly of the sheet plastic in accordance with any suitable means. Such means may comprise a hollow elastic or otherwise expanding tubular unit supplied interiorly with fluid under pressure. Alternatively, using pre-molded sheet, the entire periphery of the cylindrically formed sheet need not be subjected to pressure, and it is contemplated that after forming the sheet into the shape of a cylinder with abutting or overlapping edges upon a mandrel, the point of juncture only may be subjected to an elevated pressure at a temperature above the softening point for joining the edges. That is to say, referring to Figs. 1 to 4, the sheet, after having been wrapped upon a mandrel, may be treated to weld or heal the edges together by subjecting it to the pressure of a curved die arranged above and adjacent the overlapping portions only of the sheet so that the remainder of the tube is unaffected by this molding step.

Fig. 6 illustrates the manner in which the present invention lends itself to the provision of convenient interlocking pipe joints integral with the lengths of tube. In accordance with this construction, it will be noted that the end of one pipe section indicated by the reference letter A is formed interiorly with annular, inwardly facing recesses indicated by the reference numeral 22. The end of the adjacent pipe B is formed with a reduced portion 24 providing a shoulder 26 adapted to abut the end of the pipe A. The reduced portion 24 is provided with a plurality, preferably three, of projections 28. It will be obvious from the foregoing that when the ends of the pipe are driven forcibly together the projections 28 will slip into engagement with the annular groove 22 to lock the pipe sections together. The present plastic material provides sufficient structural elasticity to permit this manner of interconnection.

It will be evident that the pipe and configurations may be readily provided by a corresponding configuration of the associated die surfaces. The annular recesses 22 may preferably be formed after molding by heating the plastic to the softening point at those areas and deforming them outwardly by pressing. Various modified forms of molded pipe configurations coming within the scope of the present disclosure will be evident to those skilled in the art. I may also form upon opposite ends of the tubular sections various other interlocking attachment means. Alternatively, the tube may be machined or threaded to receive conventional attachment fittings, since the present product is very readily susceptible to machining operations.

The alternative preferred method of joining opposed ends of the tubular pieces, as illustrated in Fig. 8, involves welding or healing together of the overlapping portions by means of heat and pressure. It has been found that if the outer tube is heated to a temperature above its softening or curing point and forced under considerable pressure against the inner tube, a plastic, sealed juncture results. As shown in the figure, pressure may be created through the agency of a steel band or strip 30 extending around the outer tube, having the end of the inner tube inserted thereinto substantially in accordance with the previous embodiment. The opposed ends of the strip or band are joined, respectively, to a pair of rollers 32 pivotally journalled upon a frame 34. A pair of elongated handle members engage in the respective rollers, so that it will be obvious that as the handles are rotatably drawn in opposite outward directions, as shown in the figure, the band will tend to wrap upon the rollers to create a considerable tension therein. As a result, the band may grasp the outer tube to create a high compressive force necessary to promote molding. It has been possible to bring the outer tube plastic material beneath the band to the molding temperature by the application of heat to adjacent areas. As illustrated more or less diagrammatically in the drawing, an ordinary flame applied about the band has been found suitable for this purpose, although it will be understood that electrical or any other suitable heating means may be employed. It has been found, in accordance with the present invention, that while a mandrel may be inserted within the inner tube during the joining operation, satisfactory results are achieved if heating is carefully controlled so that the outer tube reaches the molding temperature before the inner tube is appreciably softened. Under such a condition the inner tube is rigid and capable of supporting the pressure forces created by the clamping device.

While several means for forming a continuous tube from a "Vinsol"-containing, felted pulp product have been disclosed, it will be understood from the foregoing that the present invention may be carried out in various additional machines. Thus plastic molding of the tubular section may be accomplished by means of a band tensioned substantially in accordance with the principles illustrated in Fig. 9 or various other ways, and it is contemplated that this process may be carried out continuously. Among other suitable treatments is the step of producing a curing and molding of the tube by passing the mandrel, wrapped as shown in Fig. 2, for instance, through a heated sleeve having a tapered aperture adapted to gradually compress the sheet material as the assembly is forced through the aperture. The present invention contemplates, moreover, the combination of the foregoing plastic tubular element with a metal or other known pipe. More particularly, the tubular plastic layer may be formed either upon the inner or outer surfaces of the metal tube to form a liner or protective outer coating, and such constructions are of great importance where a metallic or other tube is to be employed in relationships where either its inner or outer surface would otherwise come in contact with undesirable corrosive influences.

It will be understood from the foregoing that such a construction may be readily manufactured by substituting a metallic tube, for example, for the mandrel 14, as shown in the foregoing figures of the drawing. By omitting any lubricant from the surface of the tube, it has been found that the outer layer of the present "Vinsol"-pulp plastic material will tend to adhere to the outer surface of the tube and provide a permanent protective covering. Such a lining may be formed on the inside of the tube by arranging the plastic lining therein and molding with the assistance of an internal expansible mandrel.

The proportions of ingredients employed in carrying out the present invention may vary within substantial limits. On the other hand, in order to secure a tube of satisfactory character, I prefer that the extracted pine wood pitch be present in a quantity substantially equal to the weight of the fiber and preferably not less than forty per cent and not more than sixty per cent of the fiber and "Vinsol" mix. While for many purposes the "Vinsol" may vary between thirty per cent and seventy per cent, the product is of relatively undesirable character. For practical purposes, however, dispersion on the basis of the fiber-"Vinsol" mix constitutes the minimum inclusion capable of producing the present improved results.

When zinc oxide is employed for increasing the melting point of the "Vinsol" it is preferably added in a quantity substantially equal to ten per cent of the weight of the extracted pine wood pitch powder. This, however, may be varied considerably, the preferred proportioning being readily determined by test, that is, by determining the minimum proportion which is necessary to result in the desired elevation of the softening point. The proportion of the wetting agent necessary will of course depend upon the particular wetting agent or agents employed. Among those suitable are the well known higher fatty acid sulphonates and their sodium salts, the alkyl aryl sulphonates and the sodium salts of naphthalene sulphonic acid derivatives known as Alkanol B, as well as the free sulphonic acid known as Neomerpin. Another preferred wetting agent is the alkyl aryl sulphonate Nacconol NR. In general these agents so modify the interfacial tension of the phases involved as to permit rapid intermixture of the difficultly wetting "Vinsol."

The following examples illustrate the formation of two preferred plastic compositions adapted for tube formation in accordance with the present invention. According to one example, a Hollander beater is supplied with the following furnish comprising the foregoing aldehyde derivative:

Kraft cuttings _____ 14 lbs. 7 oz.
Formaldehyde-hardened "Vinsol" treated in accordance with U. S. Patent No. 2,115,496 _____ 18 lbs.
Paris black _____ 11½ oz.
Nacconol NR _____ 20 grams Preferably, the "Vinsol" product and the Nacconol are first made up in a uniform slurry with water before adding to the stock in the beater. It is preferred that the beater stock, after the addition of the resinous product, be adjusted to a pH of about 4.5 by the addition of papermaker's alum. It is thought that the alum tends to fix the small particles of "Vinsol" upon the fibers, thus permitting separation of the water in the paper- or board-forming operation and providing a combination ideal for molding. The pulp is supplied to a board-forming machine and felted and molded in accordance with the foregoing.

In considering the foregoing example, it should be noted that according to the preferred method of operation recited, the retention of the finely divided plastic solids within the felted mass has been found to amount to about eighty per cent, the remainder passing off in the whitewater. It will accordingly be evident that the proportion of the "Vinsol" furnish remaining in the final board will be substantially equal in proportion to the weight of the fiber in the board, in accordance with the above preferred descriptions of the invention.

Alternatively, the beater may be supplied with the following furnish:

| | Pounds |
|---|---|
| Kraft cuttings | 40 |
| Powdered "Vinsol" | 18 |
| Zinc oxide | 6¼ |
| Paris black | 2 |

The "Vinsol" and zinc oxide are wetted out prior to addition to the paper stock in the beater in a solution of 56 grams of Nacconol NR in 48 lbs. of water. The resulting slurry is run into the beater with the paper stock in conventional aqueous form. The foregoing sheet stocks are then dried and formed into tubular sections in accordance with the foregoing disclosure.

The present invention provides improved plastic articles having continuous wall sections and possessing many desirable properties. The resulting element is characterized by improved structural properties in that it is structurally strong and relatively hard and possesses desirable elastic properties, which render the resulting structure free from shatterability and fragility. The product, nevertheless, is highly water-resistant, being capable of absorbing only a negligible proportion of water after prolonged immersion. The nature of the product renders it non-corrodible. In spite of these advantages the product has a relatively low cost of manufacture and its light weight per unit length greatly lowers the transportation and handling costs. So also, sound transmissibility, present in many ducts and tubes, is greatly reduced, if not completely obviated. All of these properties have been found to be substantially uniform throughout the final product and including the seams or areas of juncture.

Many variations of the above invention coming within the scope of the following claims will be evident to those skilled in the art in view of the above specification.

I claim as my invention:

1. As an article of manufacture, a tubular section of plastic material comprising a continuous wall formed of an intimate admixture of felted paper fibers, said fibers being admixed with and individually separated by a product comprising a substantial proportion of extracted pine wood pitch, said extracted pine wood pitch having combined therewith a substantial proportion of zinc oxide for increasing the melting point.

2. As an article of manufacture, a tubular section of plastic material comprising a continuous wall formed of an intimate admixture of felted paper fibers, said fibers being admixed with and individually separated by a product comprising a substantial proportion of extracted pine wood pitch, said extracted pine wood pitch having its melting point increased by the addition of a basic metal compound capable of coacting to substantially increase the softening point of the resulting thermoplastic mass.

3. A tube of the class described composed of fibrous cellulosic material impregnated with a substantially petroleum hydrocarbon insoluble pine wood resin.

4. A hard, stiff, fibrous composition tubular article comprising paper stock fibres in intimate admixture with a substantial proportion of extracted pine wood pitch, said pitch being in fused condition substantially uniformly permeating the fibrous structure.

5. A hard, stiff, fibrous composition tubular article having a continuous wall section of substantially uniform strength and elasticity composed essentially of fibrous material and a substantial proportion of a fused resin comprising extracted pine wood pitch, said resin substantially uniformly permeating said fibrous structure and substantially completely surrounding the individual fibres thereof to lock them in a compressed condition, said structure exhibiting the properties of having been consolidated and compacted and the resin caused to flow under heat and pressure, of retaining its density without unmolding at moderately elevated temperatures, of homogeneity, rigidity and good structural properties.

6. A hard, stiff, fibrous composition tubular article having a continuous wall section of substantially uniform strength and elasticity composed essentially of fibrous material and a substantial proportion of a fused resin comprising extracted pine wood pitch, said resin substantially uniformly permeating said fibrous structure and substantially completely surrounding the individual fibres thereof to lock them in a compressed condition, said structure exhibiting the properties of having been consolidated and compacted and the resin caused to flow under heat and pressure, of retaining its density without unmolding at moderately elevated temperatures, of homogeneity, rigidity and good structural properties, the resin constituting from about 40 to about 60 per cent by weight of the composition.

7. A hard, stiff, fibrous composition tubular article having a continuous wall section of substantially uniform strength and elasticity composed essentially of felted fibrous sheet material and a substantial proportion of a fused resin comprising extracted pine wood pitch, said resin substantially uniformly permeating said fibrous structure and substantially completely surrounding the individual fibres thereof to lock them in a compressed condition, said structure exhibiting the properties of having been consolidated and compacted and the resin caused to flow under heat and pressure, of retaining its density without unmolding at moderately elevated temperatures, of homogeneity, rigidity and good structural properties.

8. A hard, stiff, fibrous composition tubular article having a continuous wall section of substantially uniform strength and elasticity composed essentially of a plurality of plies of felted fibrous sheet material and a substantial proportion of a fused resin comprising extracted pine wood pitch, said resin substantially uniformly permeating said fibrous structure and substantially completely surrounding the individual fibres thereof to lock them in a compressed condition, said structure exhibiting the properties of having been consolidated and compacted and the resin caused to flow under heat and pressure, of retaining its density without unmolding at moderately elevated temperatures, of homogeneity, rigidity and good structural properties.

9. A hard, stiff, fibrous composition tubular article having a continuous wall section of substantially uniform strength and elasticity composed essentially of fibrous material and a substantial proportion of a fused resin in the form of a reaction product thereof of increased softening point comprising extracted pine wood pitch, said resin substantially uniformly permeating said fibrous structure and substantially completely surrounding the individual fibres thereof to lock them in a compressed condition, said structure exhibiting the properties of having been consolidated and compacted and the resin caused to flow under heat and pressure, of retaining its density without unmolding at moderately elevated temperature, of homogeneity, rigidity and good structural properties.

10. A hard, stiff, fibrous composition tubular article having a continuous wall section of substantially uniform strength and elasticity composed essentially of fibrous material and a substantial proportion of a fused resin together with a reaction product thereof of increased softening point comprising extracted pine wood pitch, said resin substantially uniformly permeating said fibrous structure and substantially completely surrounding the individual fibres thereof to lock them in a compressed condition, said structure exhibiting the properties of having been consolidated and compacted and the resin caused to flow under heat and pressure, of retaining its density without unmolding at moderately elevated temperatures, of homogeneity, rigidity and good structural properties.

HAROLD R. GILLETTE.